United States Patent [19]

Richter et al.

[11] Patent Number: 4,570,385
[45] Date of Patent: Feb. 18, 1986

[54] COMPUTER CONTROLLED WORKPIECE FINISHING APPARATUS

[75] Inventors: John M. Richter, Pittsburgh; James G. Bair, Jr., Wexford, both of Pa.

[73] Assignee: Fox Grinders, Inc., Harmony, Pa.

[21] Appl. No.: 507,766

[22] Filed: Jun. 27, 1983

[51] Int. Cl.³ .............................................. B24B 49/00
[52] U.S. Cl. .................. 51/165.71; 364/474; 409/290
[58] Field of Search ........... 51/165.71, 165.72, 218 A, 51/5 D; 364/474, 194; 409/290, 291, 292

[56] References Cited

U.S. PATENT DOCUMENTS

| | | | |
|---|---|---|---|
| 2,394,202 | 2/1946 | Pollard | 51/218 A |
| 3,970,830 | 7/1976 | White et al. | 235/151.11 |
| 4,027,245 | 5/1977 | Bourrat et al. | 235/151.11 |
| 4,073,247 | 2/1978 | Cunningham | 364/474 |
| 4,084,349 | 4/1978 | Farrell | 51/5 D |
| 4,114,281 | 9/1978 | Pavlovsky et al. | 33/180 R |
| 4,115,956 | 9/1978 | Huffman | 51/96 |
| 4,208,718 | 6/1980 | Chung | 364/194 |
| 4,221,514 | 9/1980 | Pavlovsky | 409/291 |
| 4,348,623 | 9/1982 | Kobayaski | 364/474 |
| 4,489,522 | 12/1984 | Henseleit et al. | 51/165.71 |

Primary Examiner—Harold D. Whitehead
Attorney, Agent, or Firm—Buell, Ziesenheim, Beck & Alstadt

[57] ABSTRACT

The finishing apparatus is a grinder or like device having a workpiece holder manipulator which is translatable along X and Y axes and rotatable about a Z axis, an axis of tilt with respect to the plane of the X and Y axes and an axis normal to the plane of tilt. The grinder head is mounted on an arm which moves toward and away from the workpiece holder manipulator. All of the above movements are hydraulically powered through servo valves driven by feedback amplifiers, the feedback coming from position and rate transducers on the apparatus. Signals from those transducers are supplied through analog-to-digital converters to a digital computer with random access memory. The grinder is operated in the Teach mode by manually controlling the movement of the workpiece manipulator and grinder head to cause the grinding element to transverse the faces of a finished workpiece or a pattern thereof and the successive positions are stored in the memory. The pattern is then replaced by a workpiece to be finished and the machine in the Reproduce mode repeats the path of travel under control of the computer.

8 Claims, 11 Drawing Figures

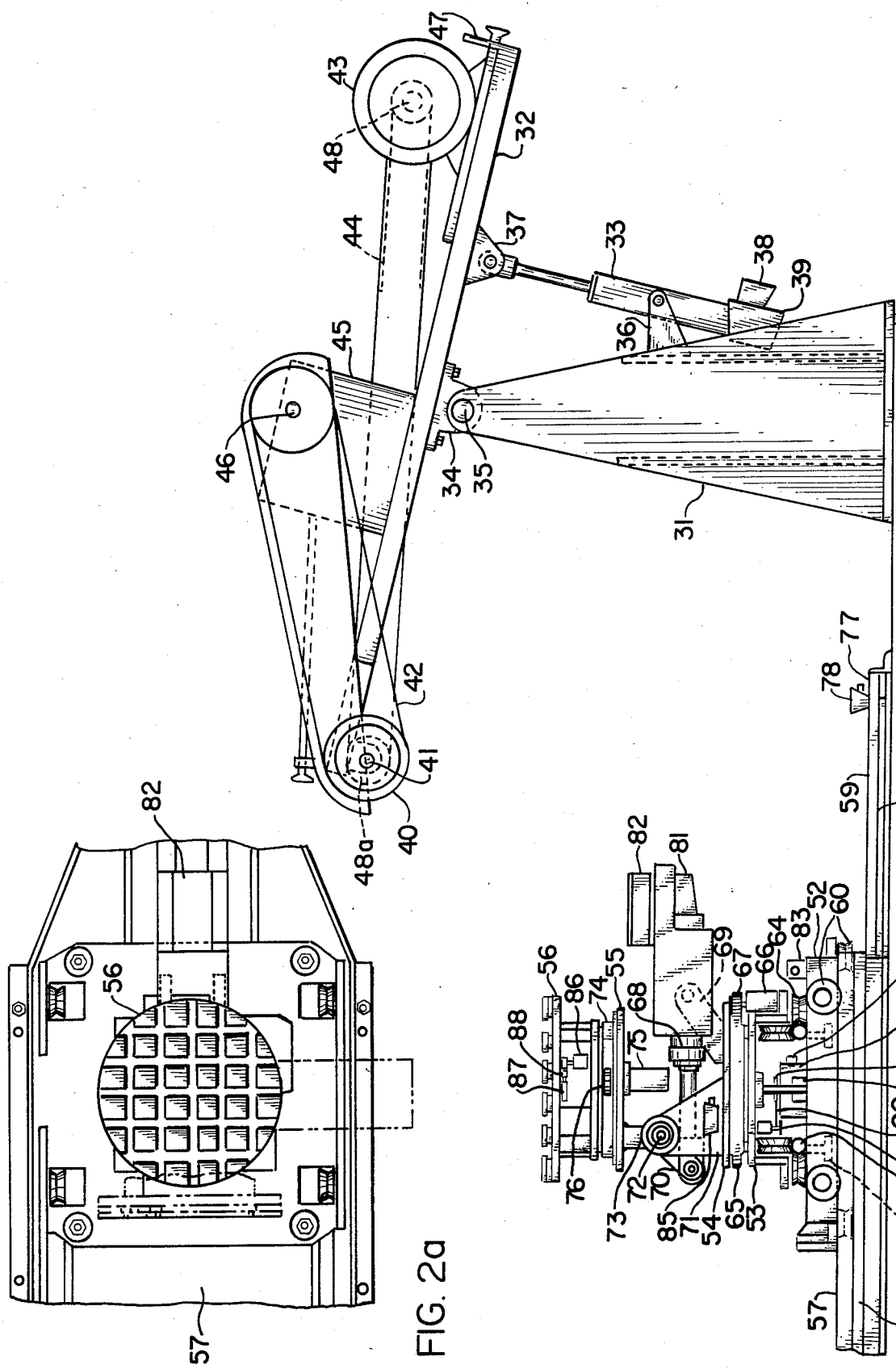

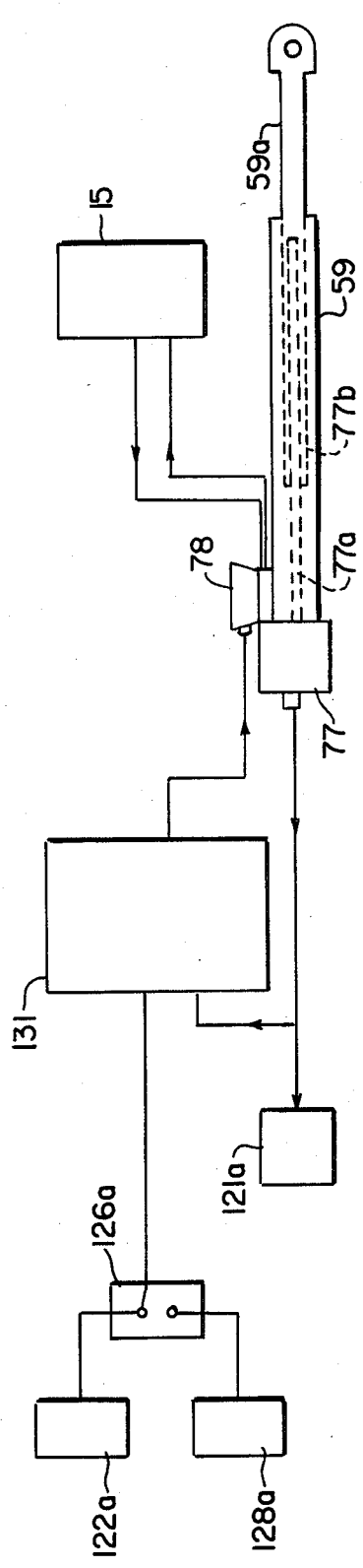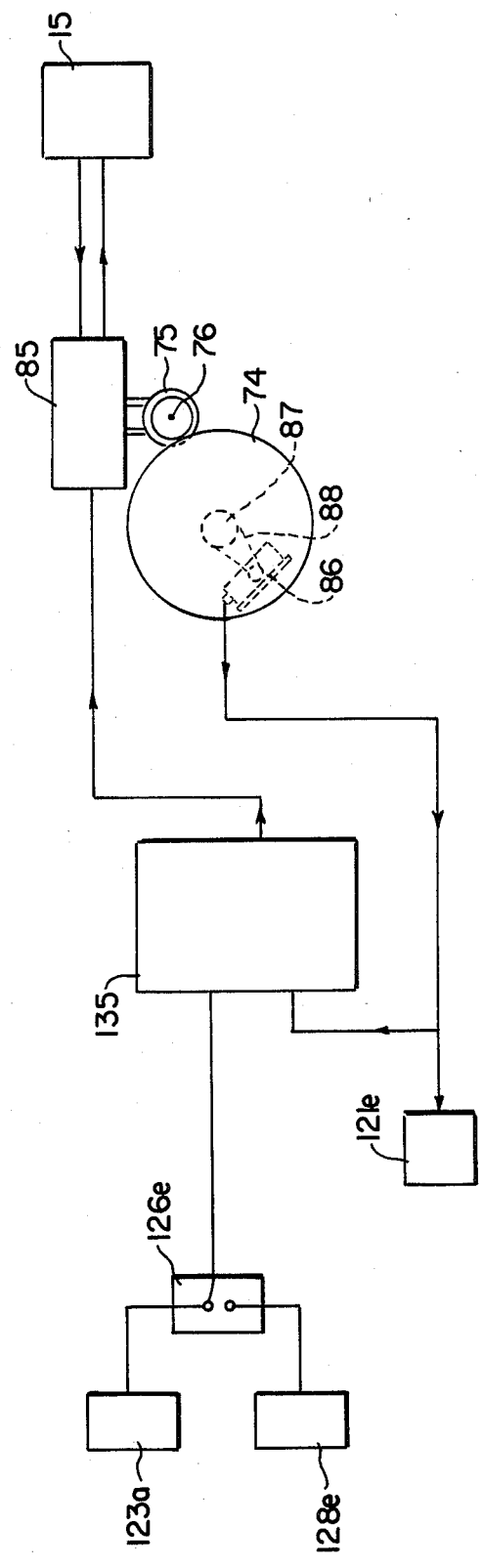
FIG. 3a
FIG. 3b

COMPUTER CONTROLLED WORKPIECE FINISHING APPARATUS

This invention relates to a machine and process for grinding or machining a rough casting or the like. It is more particularly concerned with such a machine which is automatically controlled by a computer responsive to a program externally generated, or a program which may be generated by manual operation of the machine itself.

BACKGROUND OF THE INVENTION

Machine tools and grinders have been developed in which the work path of the tool with respect to the workpiece is determined by a computer in response to an externally generated program. Such machines when fed with identical workpieces can reproduce identical articles therefrom in any number. An example of a machine so controlled is disclosed in U.S. Pat. No. 3,970,830 of Philip H. White, et al., issued Jul. 20, 1976. Machines of that nature are useful for quantity production. However, if a different shaped article is required a new program must be generated and incorporated in the computer. Machines of this type are, therefore, not well suited for short run production.

Attempts have been made to avoid those difficulties by adapting the machine to "teach" itself the program by tracing a pattern and storing the data defining its work path in a memory device from which the program is retrieved to reproduce the desired work path on successive workpieces. One such apparatus is disclosed in U.S. Pat. No. 4,221,514 of Rudolf Pavlovsky issued Sept. 9, 1980. The apparatus of that patent is limited to certain types of workpieces because it teaches itself the work path along a major surface contour of the workpiece itself.

SUMMARY OF THE INVENTION

We have invented a computer controlled machine tool system which is equally useful for production and for jobbing use. Our invention is well adapted for foundry work where rough castings must be finished to tolerance by grinding or machining, usually only in certain areas, and where various shaped castings must be accommodated in smaller or larger numbers. Our machine generates its own program from a previously finished casting or other pattern. That pattern is mounted on the work table of our machine and the grinding wheel is brought against it. The wheel is then caused to roll around the pattern surfaces which require finishing by manually controlling the movement of the workpiece holder along a plurality of axes of translation and around a second plurality of axes of rotation. The grinding wheel is caused to move in one plane only. Position transducers convert the successive positions of the workpiece head and grinder into signals which at the option of the operator are transmitted through a computer to a memory and are stored therein in the form of a computer program. We refer to this method of operation hereinafter as the "Teach" mode. That program can be retrieved from the memory when desired and through the computer used to position the workpiece holder and grinding wheel so as to reproduce the successive positions, this time with respect to an unfinished workpiece, thus automatically finish grinding it to the same shape as the pattern. We refer to this mode as the "Reproduce" mode.

Our apparatus includes a grinder and workpiece holder, which holder is movably on five axes with respect to the grinding wheel. The latter is moved toward and away from the workpiece holder. All of the above motions are hydraulically powered through servo valves. The position transducers above mentioned transmit signals through analog-to-digital converters to a digital computer and a random access memory. In the Teach mode an operator controls the movement of the workpiece holder by a joystick. Motion of the grinder head with respect to the workpiece holder is controlled through a foot pedal. In the Reproduce mode the signals in the memory are fed into the computer which, through digital-to-analog converters, controls the servo valves.

The power output of the grinding head motor is measured and used as an indication of the torque exerted on the grinder wheel. In the Reproduce mode that signal is processed by the computer along with the signals actuating the various servo amplifiers to cause the grinder to retrace sections of the grinder path during which the measured torque exceeds a predetermined normal value. In a similar way the torque signal is processed in the computer along with the servo motor signals to establish a tolerance in the Reproduce path so that metal is not removed unnecessarily.

BRIEF DESCRIPTIONS OF THE DRAWINGS

FIG. 2a is an elevation of our grinder and manipulator.

FIG. 2b is a plan of a portion of the apparatus of FIG. 2a.

FIG. 3a is a detail of a typical linear servo loop.

FIG. 3b is a detail of a typical rotary servo loop.

FIG. 5b is the grinder head control circuit associated with the circuit of FIG. 5a.

FIG. 6b is a second portion of the flow chart of FIG. 6a.

DESCRIPTION OF THE SYSTEM

Figure 1:
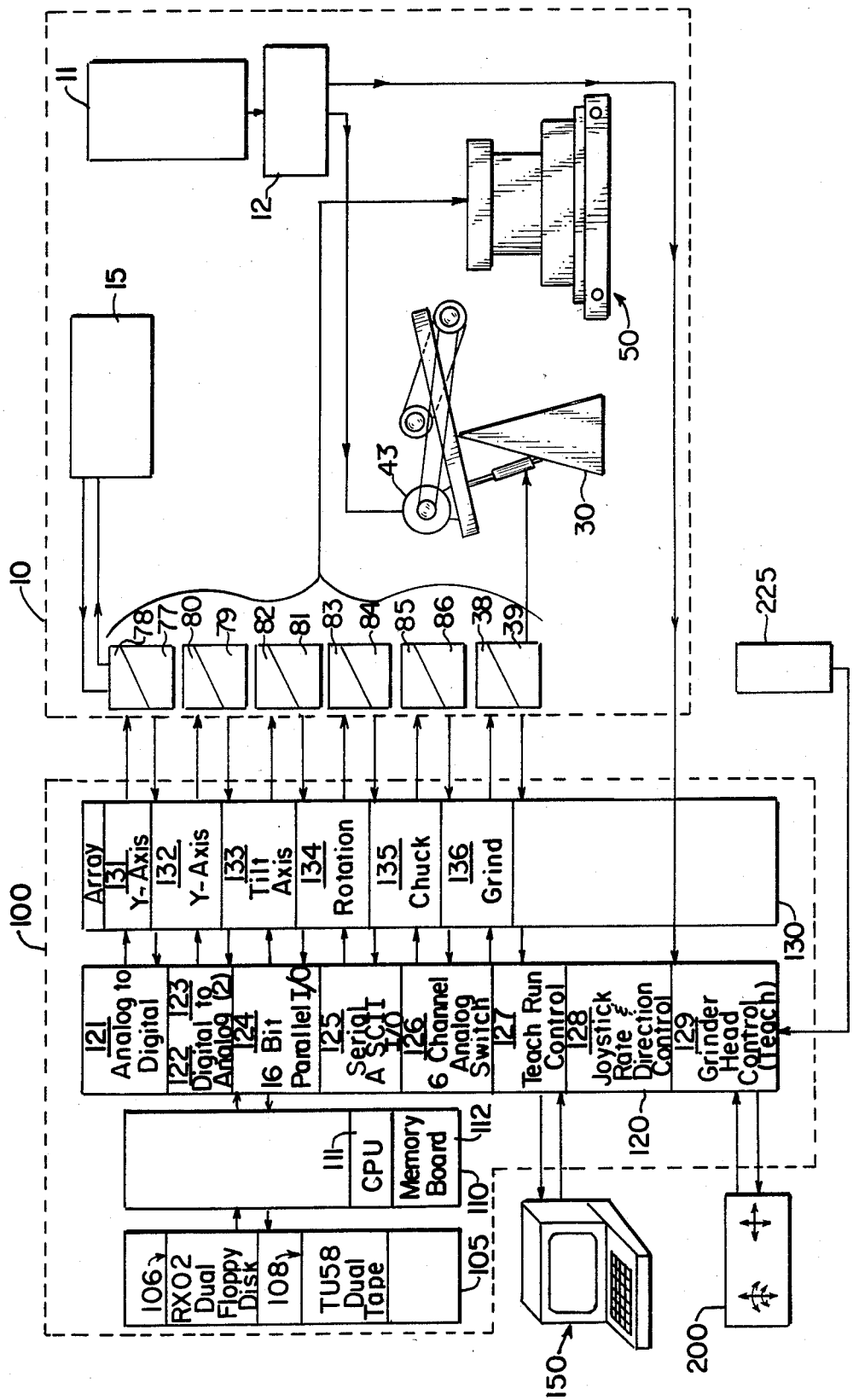
FIG. 1 is a block diagram of our system.

A computer controlled grinder is shown in FIG. 1 to include a grinder head/casting manipulator 10, a control system 100, a CRT console 150, and a manual joystick control 200. Also included is a foot-switch control 225. The control system 100 includes an electronic interface 120, a computer 110, a mass memory 106 and 108 and a servo-amplifier array 130. The control system elements are interconnected as shown with the control console 150, the joystick control 200 and the foot-switch 225, all through the electronic interface 120.

The grinder head/casting manipulator 10 comprises a workpiece manipulator 50 adjustable along five axes and a 'chopper' type grinding head 30. The position and motion of the grinding head and the manipulator along each of these axes is controlled by means of servo-balancing hydraulic positioners, all of which are powered by a 25 h.p. electrically driven pump 15. Position on each of the axes is controlled by a servo positioning system consisting of a linear actuator or a rotary actuator, FIGS. 3a or 3b, a servo valve, a servo amplifier and a position feedback transducer. These elements are connected together, with stable proportional gain, to form a reasonably accurate positioning system for each axis. In addition, the control system 100 provides real-time monitoring and control over the many independent position adjusting loops so as to synchronize them and to reduce load-induced errors to negligible proportions (quasi-integral action).

Although the 'chopper' type grinding head 30 is shown fitted with a grinding belt, it will be understood that this mechanism may also be fitted with various sizes of grinding wheels and that the system may be adapted to the use of cup-wheels for certain internal metal removal operations, or milling cutters In order to grind the very rough surfaces of some castings, control of applied grinding force must be effected. Accordingly, the torque applied to the grinding wheel (or contact wheel) is monitored inferentially by means of a three-phase full-wave precision rectifier 12, the output of which is sent to the computer 110 for processing.

The five-axis joystick 200 and the foot-switch 225 are used, in conjunction with the control system 100 and the control console 150, to effect the "Teach" mode, wherein the operator may select any number of axes to be controlled manually, and to record at will, any particular set of motions of the casting and the grinding head.

DESCRIPTION OF SYTEM OPERATION

There are two modes in which the machine may be operated. The first of these is the "Teach" mode, the second the "Reproduce" mode. The first mode functions in the following way: A finished casting, of the type to be ground in production, or a pattern thereof, is mounted on the workpiece table (chuck) by means of a clamping/indexing fixture designed for the particular casting type. By "finished" we mean a casting that has been hand-ground or milled to the dimensions desired in the finished product. The operator uses the joystick selector to select the "Teach" mode, allowing him to move the manipulator along any or all axes at will. While the manipulator is moving, the operator may elect to record the position data in memory or simply to move the manipulator around, "practicing" a particular grinding strategy. The motion of the manipulator via joystick control is derived as follows: Along each axis is positioned a rate generator (integrator) such that when the joystick is displaced from center position, the manipulator moves in the direction of displacement and at a rate proportional to the amount of displacement. When the joystick is returned to center position, motion stops at the last position achieved by the manipulator except for a very slow 'creep' (integator "windup"). This creep is eliminated completely when the operator 'de-selects' the axis via the computer-controlled push-button axis selector switch. The foot-switch control allows the operator to raise and lower the grinding head, which is not powered for grinding during teach mode grinding operation. The grinding medium is allowed to roll freely over the pre-ground finished casting or pattern at low force levels so as to record the position selected by the operator that the grinding head will seek relative to the manipulator during reproduce mode operation, when the grinding head *is* powered. The low, constant force applied to the contact between the grinding medium and the casting is maintained as long as the "Down" switch is applied. When the foot switch is released completely, the grinding head position is locked to prevent drifting of the head position while the head is retracted.

During a teach operation, the operator would follow this typical procedure:

1. Manipulate the casting to the starting position and de-select all axes.
2. Bring the grinding head to within 1 to 2 inches of the casting surface.
3. Press the "Rapid Transit" button once, recording the initial position of all axes including the grinding head.
4. Select the axis or axes along which to move the casting surface for the desired grind.
5. Bring the grinding head into contact with the surface by depressing the "Down" foot switch continuously and pressing the "Record" switch continuously while moving the manipulator along the appropriate axis to produce the desired grind contour. The manipulator motion should be constrained to that which will generate a contact tangent line on the grinding wheel's diameter that is nominally horizontal, plus or minus 45 degrees.
6. When the contour has been traced, lift the grinder head with the foot-switch control and then release the "Record" button, de-selecting the active axis.

The foot switch should not be released when teach contact has been made between the grinding wheel and the casting as high reaction forces may develop because of the locking feature in the grind actuator under these conditions.

The means of recording the position data in memory, during teach mode, is to store the measured position of the manipulator with respect to the several axes into random-access memory as a row of data during the instant when a timing strobe occurs and the Record button is selected. The timing strobes occur in a precisely periodic way at 0.100 second intervals. The measured data array in this case is made up of six columns of 16 bit data words, each of which corresponds to a particular axis, while each row corresponds to the position of the manipulator as regards all axes at an instant of time. The complete record, when replayed from the beginning, will reproduce a nominally continuous path representation of the motion of the machine during the teach session. The real-time playback of such a record during reproduce mode operation is done at approximately five times the rate at which the data were recorded in Teach mode. Note that "Rapid-Transit" record allows the user to record point-to-point transitions in position, for example, to move the manipulator from any rest position to the 'Initial' position as rapidly as possible, while "Record" allows for precision "Continuous-path" pattern recording.

Machine operation in the "Reproduce" mode is essentially the inverse of "Teach" as follows: To run a grinding pattern on the machine, the operator selects the reproduce mode and the CRT console display prompts selection of one of three options:

1. Run pattern in workspace?
2. Get pattern from storage?
3. Store workspace pattern?

Assume that the operator selects option 1, the pattern in the workspace having been "taught" previously. He or she will now proceed to run the pattern.

1. Place an unfinished casting of the type described by the program into the clamping fixture, taking care to orient the indexing marks correctly and tighten the clamps securely.

2. Enter values for operating constants as prompted by questions on the CRT console: "BLINK"? (time scaling value for replay speed); Rapid Transit 0–10, enter '5', for example, RETURN, "TORQUE"? (setpoint value for maximum power into grinding process); enter '600', RETURN, "GRIND OFFSET"? (bias on grinding surface set-point); enter 'O', RETURN.

3. Operator now starts the grinding belt drive (the hydraulic pump is already running) and when the belt is up to speed, presses the RETURN key on the console. The program commences and proceeds as follows:

TYPICAL SEQUENCE OF PROGRAM EXECUTION

1. The manipulator is moved rapidly from the current park position to the initial position of the grind sequence. The operating program makes no attempt to check torque, as no grinding has yet commenced, and there is no axis-to-axis speed synchronization. In fact, the manipulator is moved from the starting point to the ending point along all axes simultaneously. Note that if no movement occurred on any axis during Teach, it will not occur during Reproduce. When the manipulator is positioned with respect to all axes within the required tolerance of the initial positions, the program begins executing the next, or grinding, phase of the sequence.

2. The grinding phase of the sequence is somewhat more complex, requiring good synchronization of movement on all axes with the motion of the grinder head as the grinder is tracing complex contours on the surface of the casting. To accomplish this synchronization, the computer drives the grinder head motion at the maximum speed allowed by the 'Blink' value (the grinder head is the slowest axis) and, by sampling position data over very small time-intervals, computes the actual speed of the grinder motion. Manipulator movements on all axes are controlled at rates proportional to this measured speed to keep the grinding medium in step with its relative position on the casting surface as programmed during teach. The effect of this synchronization activity is to allow the grinding to progress quickly when the grinding contour is simple, as in the case of straight line movement, on one axis, and relatively more slowly when the contour is complex, as in the case of concurrent movement on several axes, to trace the surface of a rotating rectangular solid. The motion generating sub-routine in the computer performs another task as the preceding operation is taking place, namely, it samples the value of torque fed back from the grinder motor and compares it with the setpoint torque entered by the operator during set-up and, if the measured value exceeds the set value, initiates a "Bump" routine to retrace the region of the casting surface where the bump exists until the bump is removed (Torque is again less than, or equal to, Torque Set).

3. Finally, at the end of the program, the head is lifted and the axes return to park.

DETAILED DESCRIPTION OF THE PREFERRED EMBODIMENTS OF SYSTEM

A. Grinding Head, FIG. 2

The grinding head 30 comprises the floor-mounted trunnion 31, the grinder backbone 32, and the hydraulic actuator 33. The grinder backbone 32 is pivotally attached to the floor-mounted trunnion 31 by means of a horizontal shaft 35 and two pillow blocks 34. The hydraulic actuator 33 is pivotally attached intermediate its ends to the floor-mounted trunnion 31 via a trunnion mount 36. The piston rod of the hydraulic actuator 33 is attached to the backbone 32 via a clevis 37. The hydraulic actuator 33 contains an integral linear encoder with electronic connector 39. The grinding head position servo valve 38 is mounted on the manifold port of the hydraulic actuator 33. At one end of the backbone 32 is positioned a horizontal spindle 41 carrying a driven contact wheel 40, an idler 46, a coated abrasive belt 42 trained around wheels 40 and 46, an alignment and tension adjustment device 45, and an electric drive motor 43. Motor 43 is mounted on an adjustable motor base 47 for regulating the tension of the drive belt 44 trained around motor sheave 48 and contact wheel sheave 48a.

Figure 5A:
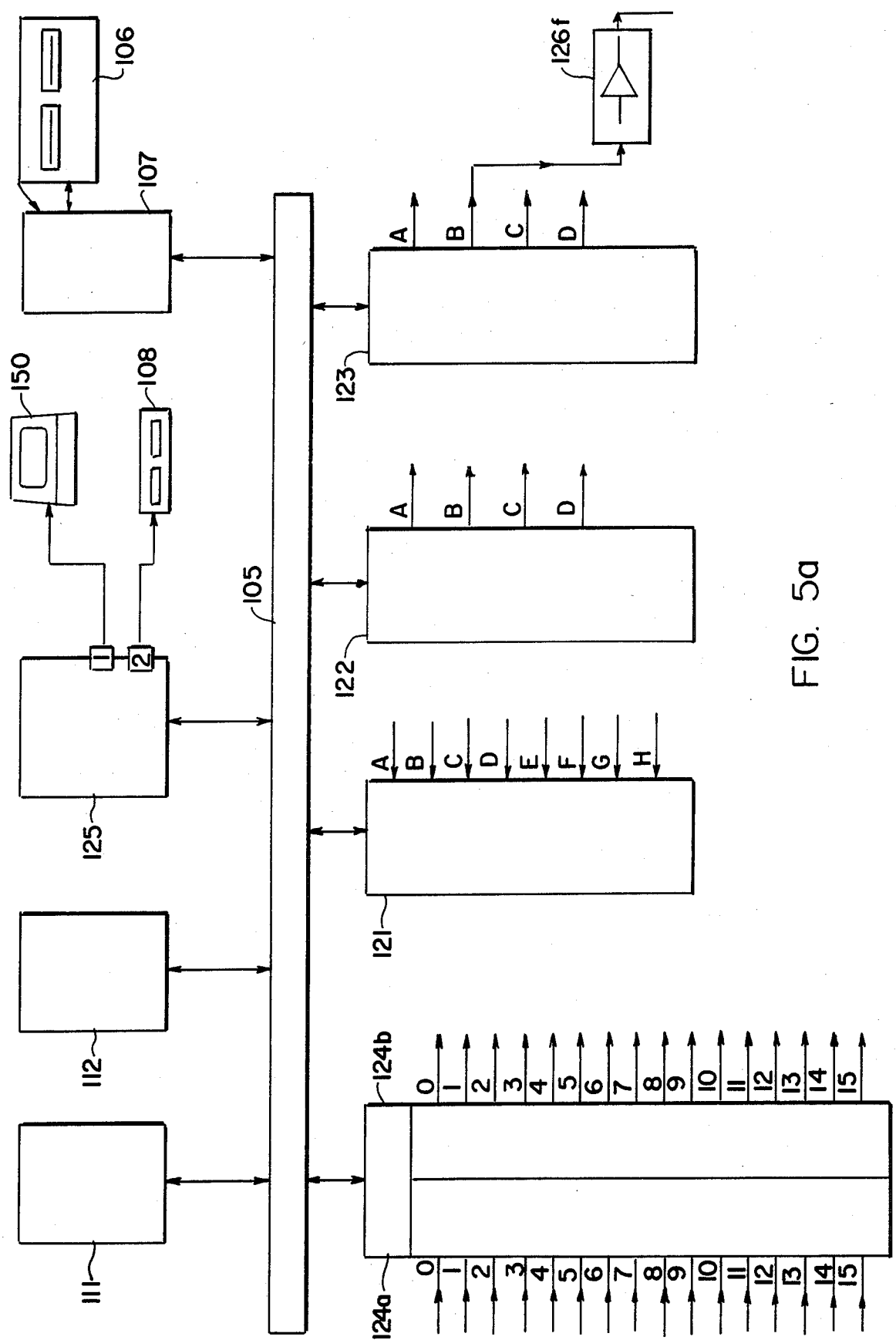
FIG. 5a is a detail of an interface circuit.
Figure 5B:
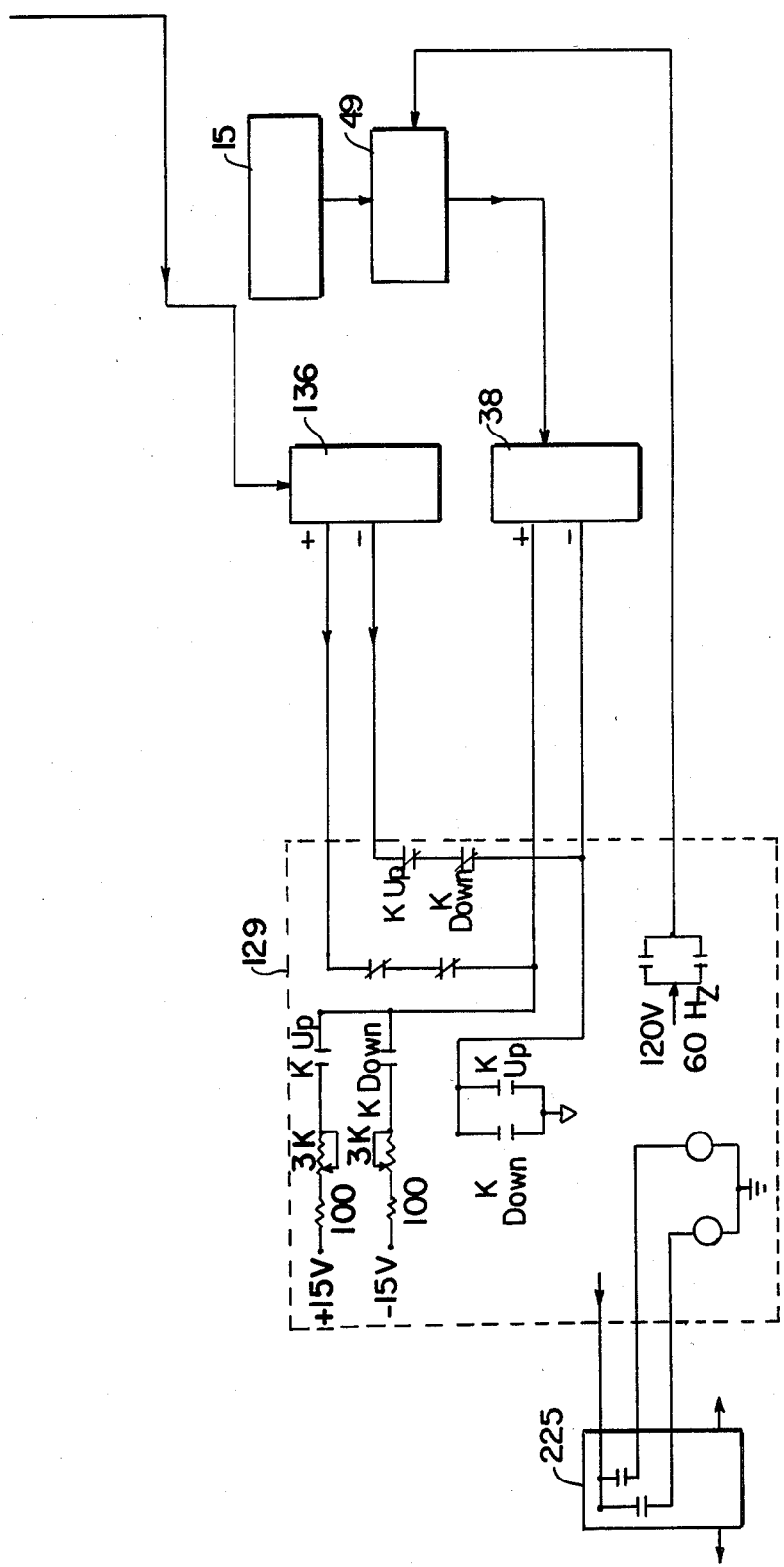

B. Reproduce/Teach Hydraulic Valve Control—FIG. 5b

Figure 4A:
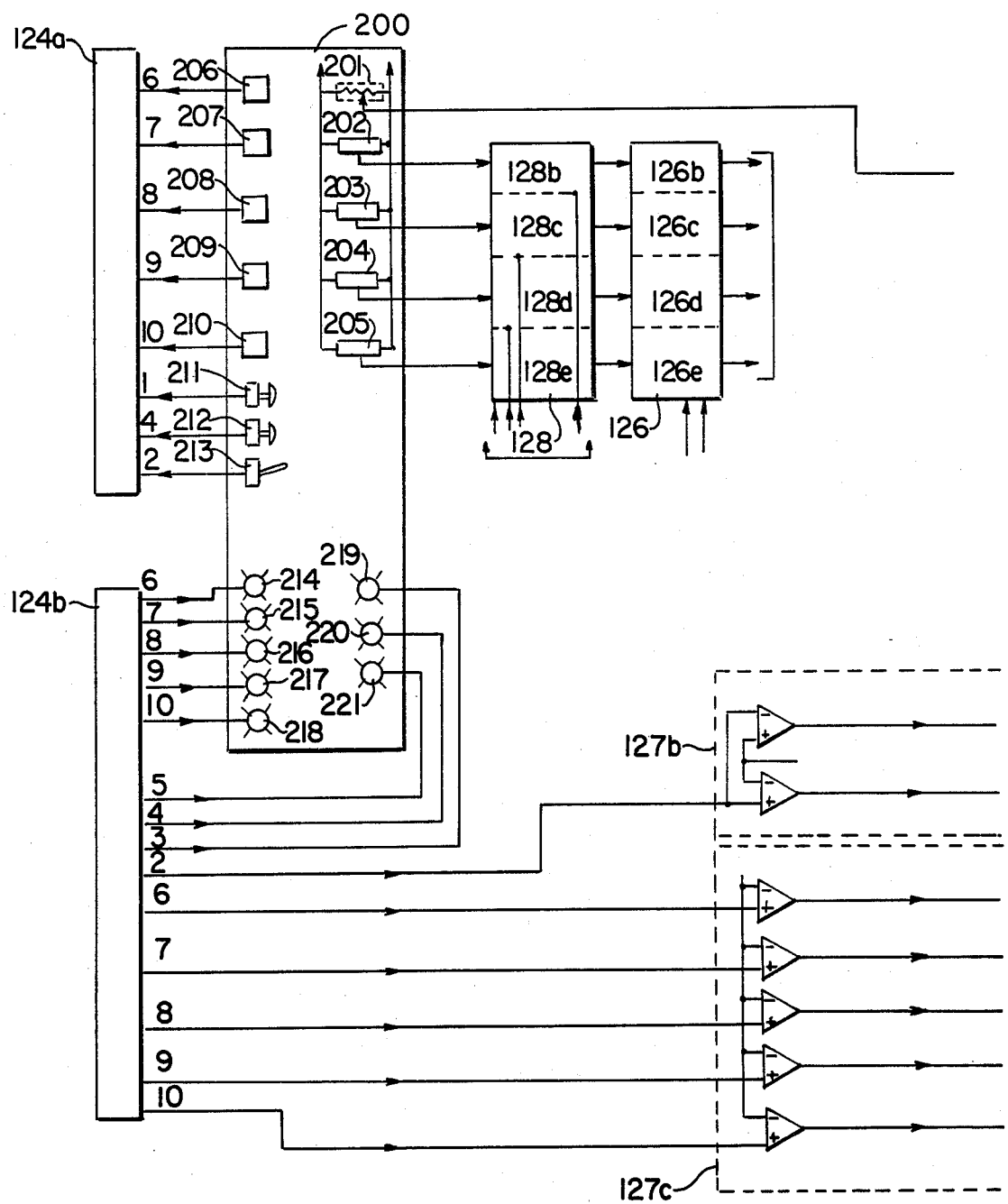
FIG. 4a is a detail of a the joystick and Teach-Reproduce circuit.

The hydraulic pressure reducer valve 49 accepts oil supply and return lines from the hydraulic pump 15 and, in turn, applies pressure-modified oil supply to the grind servo valve 38. When the valve 49 is energized, the output pressure is low, on the order of 200 psig, and when that valve is de-energized, the output pressure is full pressure from the pump 15, about 1600 to 2,000 psig. The Reproduce/Teach switch 213 (FIG. 4a) and the rocker foot-switch 225 interact with the grinder head control 129 in the following way; when the system is in the Reproduce mode, the grinder head control 129 is disabled and the output of the grind servo amplifier 136 is connected directly to the grind servo valve 38 allowing the output of the grind position control block 126-f to control the position of the grinder head at full line pressure as the valve 49 is de-energized. When the system is in the Teach mode, and either "up" or "down" foot switch contacts are made, the servo amplifier 136 output is disconnected from the servo valve 38 and the appropriate current source in the grinder head control 129 is connected to the servo valve 38 driving the grinder head up or down at a constant rate and at lowered force because the valve 49 is energized. When in Teach mode and foot switch 225 is not energized, the output of the servo amplifier 136 is connected to the servo valve 38, locking the grinder head in the position most recently achieved.

C. Five Axis Casting Manipulator, FIGS. 2a and 2b

The manipulator 50 has six steel weldments comprising the X axis base 51, Y axis platform 52, the X and Y axes being normal to each other, bottom rotation platform 53 rotatable about the Z axis normal to the X and Y axes, tilt platform 54, top rotation platform 55 which rotates with bottom rotating platform 53, and rotating workpiece holder or chuck 56. In its position shown, chuck 56 rotates about the Z axis. Base 51 provides a support for two hardened round ways 57 which are mounted on rail supports 58. Also mounted on base 51 is the X axis cylinder 59 the piston rod of which is connected to the Y axis platform 52. The Y axis platform 52 rides on round ways 57 utilizing eight "V" shaped rollers 60. Mounted on the Y axis platform 52 are two round ways 61 which are affixed to support rails 62. Also mounted on the Y axis platform 52 is the Y axis cylinder 63, the rod of which is connected to the bottom rotation platform 53. The bottom rotation platform 53 rides on the round ways 61 on eight "V" rollers 64. Mounted between the tilt platform 54 and affixed thereto and the bottom rotation platform 53 is a large diameter ball bearing with an integral external gear 65. Also mounted on the bottom rotation platform 53 is a rotary hydraulic motor 66 which carries on its output shaft a drive pinion gear 67 which meshes with the teeth of gear 65.

Tilt cylinder 68 is supported by tilt platform 54. That cylinder is pivoted in a trunnion 69. The piston rod of tilt cylinder 68 is connected to a clevis 70 depending from top rotational platform 55. That platform 55 is supported by a trunnion 71 which projects upwardly from tilt platform 54. Incorporated in the trunnion 71 is the tilt shaft 72 which is mounted on two trunnion bearings 73. Mounted for rotation on top of top rotational platform 55 is a large diameter ball bearing with an integral internal gear 74. Affixed to the top rotational platform 55 but below it is a rotary hydraulic motor 75 which has mounted on its output shaft a drive pinion 76 which meshes with the teeth of bearing gear 74. Positioned on the top of the large diameter bearing 74 is a rotating workpiece holder or chuck 56.

The X axis hydraulic cylinder 59 contains an integrally mounted linear position encoder with electronic output connector 77. The X axis servo valve 78, is attached to the manifold surface of the X axis hydraulic cylinder 59. The Y axis hydraulic cylinder 63 contains an integrally mounted linear position encoder with electronic output connector 79. The Y axis servo valve 80 is attached to the manifold surface of the Y axis hydraulic cylinder 63.

The tilt cylinder 68 contains an integrally mounted linear position encoder with electronic output connector 81. The tilt cylinder servo valve 82 is attached to the manifold surface of the tilt cylinder 68.

The bottom rotation servo valve 83 is mounted on the Y axis platform 52 and is connected to the bottom rotary hydraulic motor 66 via flexible hoses. The bottom rotational axis encoder 84 is attached to the Y axis platform 53 and is driven by timing belt 90 via sprocket 89 which is attached to the center shaft of the tilt platform 54.

The chuck control servo valve 85 is attached to the tilt platform 54 and is connected via hydraulic hose to the chuck hydraulic motor 75.

The chuck rotary encoder 86 is attached to the top rotational platform 55 and is driven by timing belt 88 which in turn is driven by sprocket 87 attached to the center shaft of the chuck 56.

The upper surface of chuck 56 carries a grid marking, as appears in FIG. 2b, which facilitates the positioning of successive identical workpieces therein in the same position with respect to the chuck.

D. Control System—FIG. 5a

1. Computer

The computer 110 (FIG. 1) is a Digital Equipment Corporation LSI-11/2 configuration with a central processor 111 comprising a KD11-HA dual height card equipped with a KEV11 extended arithmetic chip. In addition, random access memory is provided by a memory card 112 and a section of the multi-purpose card 125 for a total of 64K bytes or 32K 16-bit words of "RAM". The complete digital interface to the computer comprises the following array of commercially available devices, all of which are connected to the 'DEC' Q-Bus 105; Computer card 111 KD11-HA, Memory Card 112 MSV11-DC, Multi-purpose Card 124 MXV11-AC, Floppy Disc Control Card 107 RXV11, Parallel I/O Card 124 DRV11, Analog-to-digital converter 121, Analog Devices, Inc. Model RTI-1250, Two each Digital-to-Analog converters 122 and 123, Analog Devices, Inc. Model RTI-1252-4. Additionally, the CRT control console 150 (FIG. 1) and the TU-58 tape drive 108 are each connected to the appropriate serial I/O port on the Multi-purpose Card 125 and the floppy disc drive 106 is connected to its control card 107.

2. Memory

Real-time data and program storage for the system is all located in 32K 16-bit words of random-access memory located, as mentioned above, in the memory card 112, and in the Multi-purpose card 125. Typically, 2K words are allocated to memory-mapped I/O, 12K words are allocated to control programs and 18K words are used for the 6 word-column by 3000 row data array in which the position data reside. Mass data storage is provided for by the floppy disc system and, for the harsh environments in the foundry, by the TU-58 108 tape system. That system emulates the floppy disc 106 in storage capacity, but it is much slower for data retrieval.

3. Analog-to-Digital/Digital-to-Analog Interface

The Analog to Digital Interface Converter 121 provides the means by which all voltage-borne position data (for example, the output of the X-axis transducer 77 shown in FIG. 3a) and any other voltage data are input to the computer 110 for real-time processing or storage in the data array as points to be reproduced during Reproduce mode operation. In the present configuration (see FIG. 5a) there are eight quasi-differential, multiplexed channels, the first six of which are used for X, Y, TILT, ROTATION, CHUCK AND GRIND position inputs. The seventh channel is used to monitor grinding applied power, the so-called torque input (Block 12, FIG. 1) while the eighth input is unused. The various voltages are applied directly to the various inputs of converter 121 as ±10 volts full scale. The corresponding digital word in the computer is a 12-bit counting process in what is called 2's complement binary arithmetic, yielding 4096 counts, including sign, for basic accuracy on the order of 0.02%.

The Digital-to-Analog converters 122 and 123 are the means for commanding the various voltage commanded servo amplifiers to act in conformance with the computer derived position signals which are output from the computer in the form of digital words, identical except for computed variations as required for control, to the words stored in memory via the Analog-to-Digital converter 121 described above. In the present configuration, only six of the eight available outputs are used, one for each axis X thru grind respectively.

4. Servo Amplifiers—FIGS. 3a and 3b

Typical servo loops are illustrated: FIG. 3a relates to linear acting position-adjusting actuators, the elements of which are (for the X axis) the hydraulic actuator 59, the servo valve 78, the position transducer 77 and the servo amplifier 131. The position transducer 77 contains elements as follows: stainless steel ultrasonic magnetostrictive rod 77a, permanent magnet 77b, electronics to excite the rod at some ultrasonic frequency, and crystal-controlled timing elements for resolving the round-trip time for the ultrasonic wave which is reflected at the current position of the magnet 77b and hence, the actuator rod. The round-trip travel time of the wave is resolved to an analog voltage of ±10 volts full-scale which is, in turn, applied as a feedback signal to the servo amplifier 131 and to the appropriate analog-todigital converter channel 121a. The stainless steel rod 77a is attached firmly to the actuator cylinder 59 while the magnet 77b is attached firmly to the actuator rod 59a resulting in a very rigid, high "stiffness" coupling between actuator and transducer. The linear position actuator/transducers used in this case are available from Moog, Inc. as series A-86 Servoactuators and are directly compatible with series 62-105 servo valves which are used for all axes.

The rotary servo loops, shown in FIG. 3b, are configured in the same way, except for the transducer and servo actuator, which are as follows: The rotary actuator 75 is a high torque, low-speed rotary vane motor coupled to a Moog series 62 servo valve 85. The output shaft of actuator 75 is coupled to a gear 76 which imparts rotary motion to the chuck 56 via a ring gear 74. The resultant rotary motion is transmitted to the rotary transducer 86 by the combination of a centrally mounted sprocket 87 attached to the chuck on its axis and a precision timing belt 88. The combination of the timing belt and the vane type motor results in a system of somewhat less stiffness, but adequate speed and stability are observed. The transfer coefficients of the various elements of the system are as follows: $K_v$(Servo valve constant)=0.54 in³/sec-milliampere for all axes. $K_f$ (feedback constant)=20 volts/l inches, where l=length of axis in inches. For the rotary axes, $K_f$=20 volts/alpha, where alpha is total angle in degrees. For instance $K_f$ for X is: 0.417 volts/in.; and for chuck, $K_f$=0.044 volts/degree. The transfer coefficient for the servo amplifier $K_a$ varies from 5 milliampere/volt to 100 milliampere/volt by "gain adjustment".

Figure 4B:
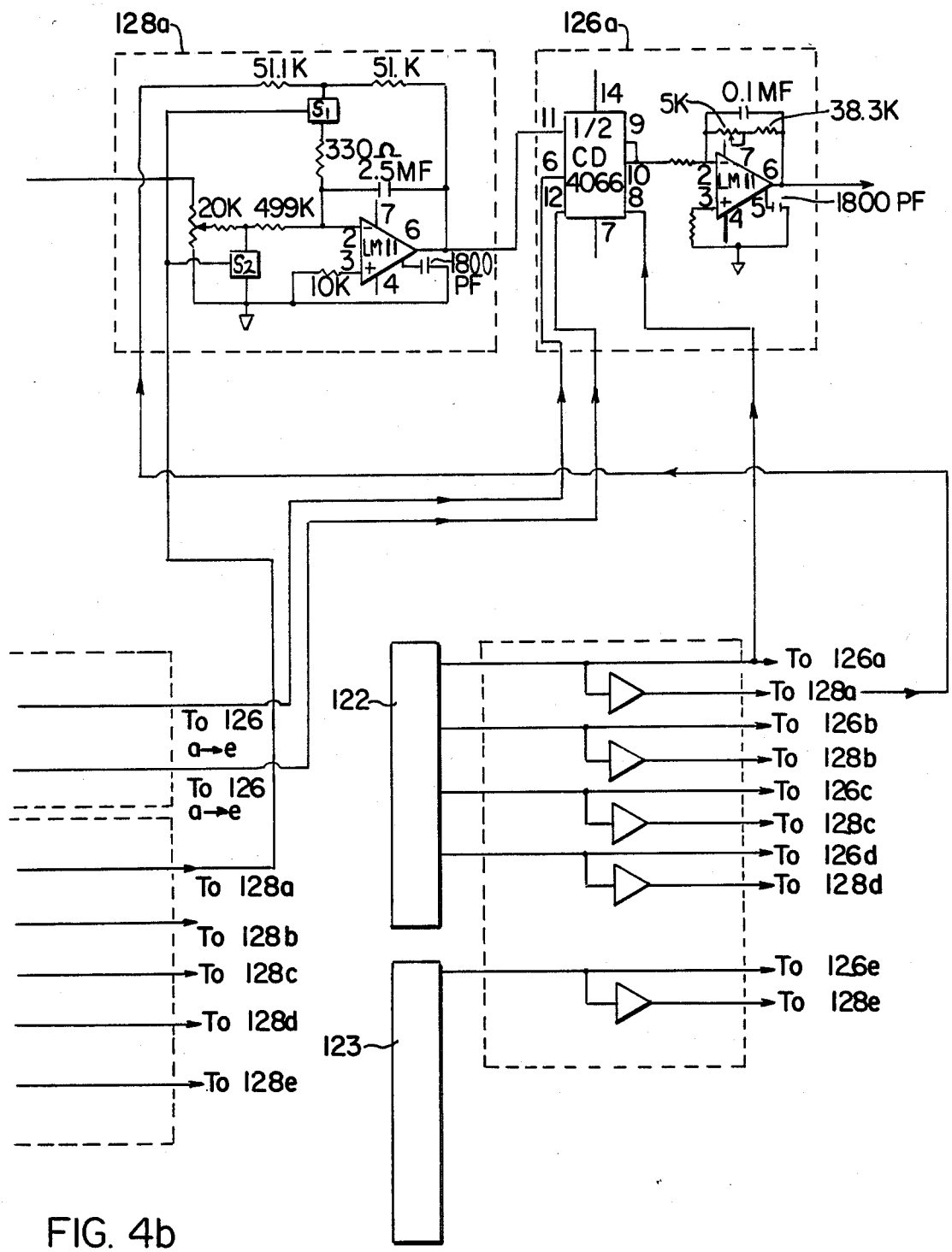
FIG. 4b is detail of a typical integrator rate control circuit.

5. Joystick Programming Station—FIGS. 4a and 4b

The joystick control station 200 comprises five control axis mechanical actuators, each of which is attached to a potentiometer connected so that the output voltage of each is zero volts at center position, deviating to positive or negative as the actuator is displaced from center position. These axis transmitter potentiometers are designated as follows X axis 201, Y axis 202, Tilt axis 203, rotational axis 204 and chuck axis 205. Associated with the above potentiometers are axis select push-button switches X axis 206, Y axis 207, Tilt axis 208, Rotational axis 209, chuck axis 210. The Teach/Reproduce selector, FIG. 4a, 213 Record push-button 211 and rapid-transit push-button 212 make up the remainder of the controls on the joystick panel. Indicators of current status are: X axis selected 214, Y axis 215, Tilt axis 216, Rotational axis 217, Chuck axis 218, Teach 219, Reproduce 220 and Record 221. The axis select switches 206–210, the Teach/Reproduce (mode select) switch 213, the Record switch 214, and the Rapid-Transit switch 212 are each connected to a particular bit-position of the parallel I/O input section 124a FIG. 5a. The status lamps 214–221 are shown to be connected to individual output lines of the parallel I/O output section 124b. The computer 110 scans all of the input lines to 124a and writes appropriate bits to 124b on a continuous basis. The sensing of a switch contact and the lighting of the appropriate status lamp are substantially instantaneous. The status of the mode select and axis select is also connected from the output of 124b to the comparator/switch drive blocks 127b and 127c. The various outputs of block 127c are connected to the various axis select switch inputs in block 128, which is the rate generator block. The output of block 127b is a pair of switch driver lines which are used to control the various single-pole double-throw solid-state switches in the Teach/Reproduce output selector block 126. The Teach mode signal flow is shown for the X axis, which is typical, to originate at the transmitter potentiometer 201 and then to block 128a. The function of block 128a is as follows: the incoming joystick signal is amplitude scaled by the rate adjust potentiometer and applied to the integrator amplifier which consists of the 499K ohm resistor and the 2.5 microfarad capacitor in the operational legs of the LM11 amplifier. When the axis select switch is on, both S1 and S2 are off, allowing the integrator to function by the relation:

$$V_{out} = \frac{1}{RC} \int -V_{in} dt.$$

The characteristic time of the integrator is 1.25 seconds, which means that the output voltage increases by the value of the input every 1.25 seconds. The output is a rate function of the input over a wide range, from zero when the transmitter potentiometer 201 is centered, to perhaps full output in a few seconds. When the axis is deselected, both S1 and S2 are on. S1 connects the network of 51K ohm resistors into the operational network in such a way that the inverted digital-to-analog signal from 127a becomes (while S2 eliminates the transmitter input) the only effective input to a unity gain inverter amplifier, yielding an input to 126a that is the same as the non-inverted digital-to-analog output. The purpose of this is to freeze the axis position exactly as it is when the axis is de-selected. Block 126a is simply a two input solid-state switch connected such that, depending on the state of the Teach/Reproduce switch 213 either the output of block 126a or block 128a is connected to the buffer/amplitude scaling amplifier which, in turn, drives the output command signal to the particular axis.

6. CRT Display Keyboard

The CRT and keyboard 150, FIG. 5, are connected to the computer 110, FIG. 1, via the serial I/O input 125 and are the principal means of promptly necessary response from the operator and of accepting such response (keyboard).

7. Grinding Work Sensor (Torque Detector)

The torque detector 12, FIG. 1, is connected to the interface 120, specifically to the Analog-to-Digital converter 121, FIG. 5, and is connected to monitor the three-phase current from the power control panel 11 to the grinder drive motor 43. The purpose of this is to provide instantaneous information to the computer regarding the amount of grinding load at the surface of the casting. The circuit of element 12 is simple, being a precision three-phase full-wave rectifier based on operational amplifier application notes which may be found in standard handbooks. The output scaling of this unit 12 is 10 volts for 80 Amperes in the motor feed line.

Figure 6A:
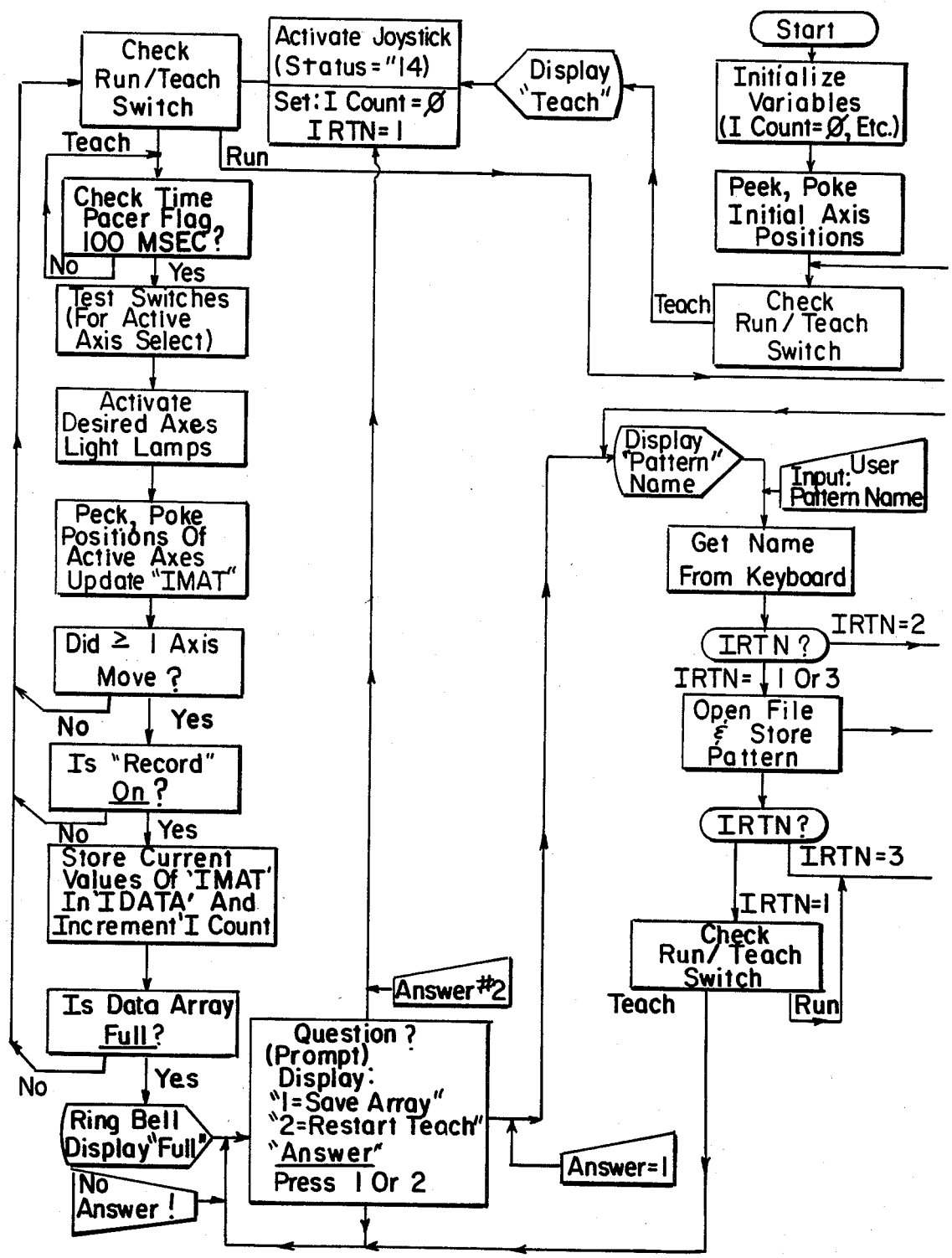
FIG. 6a is a first portion of the control program flow chart.
Figure 6B:
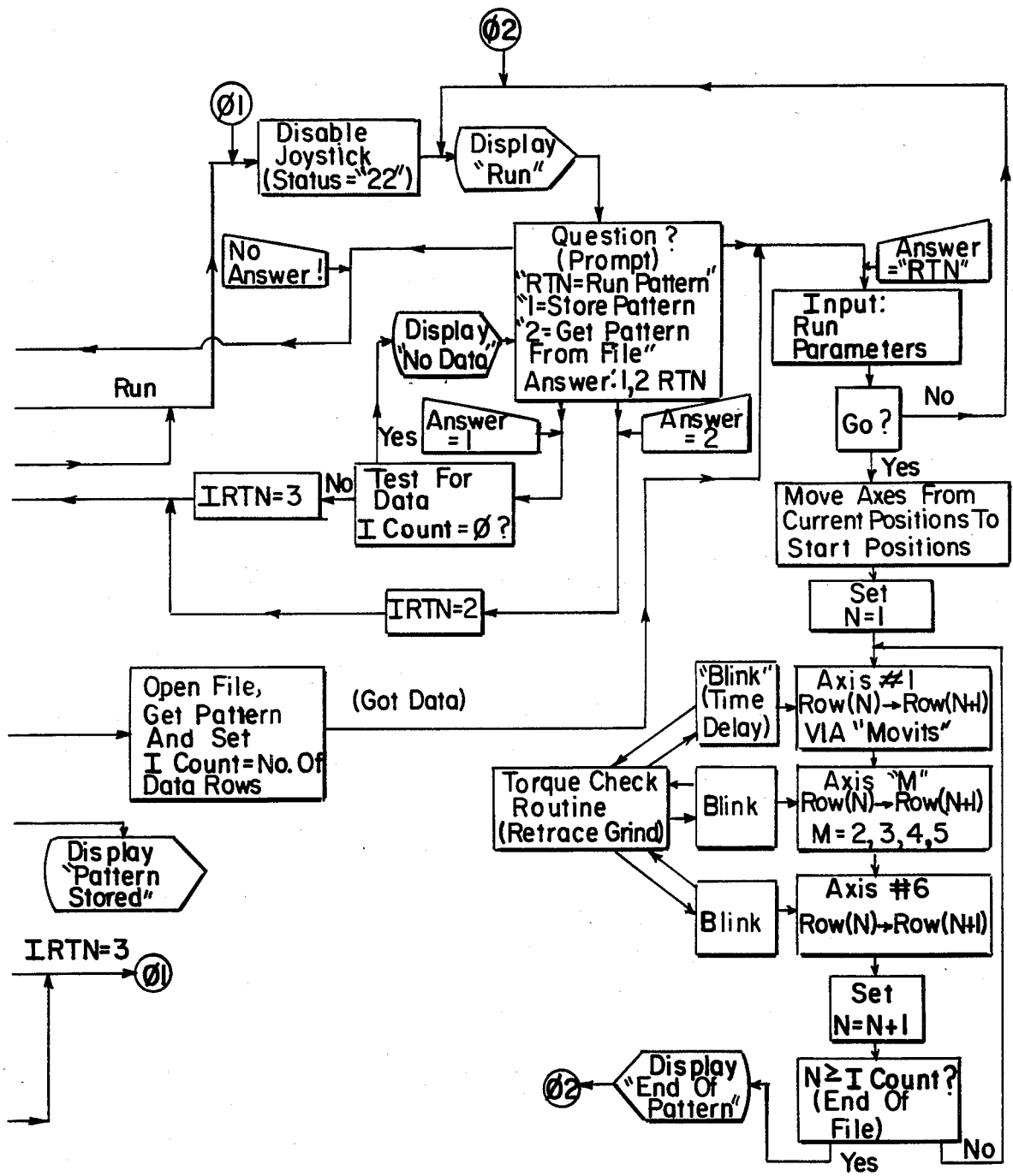

E. Control Program—FIG. 6 As the Control Program Flow Chart shows the program allows the operator to perform the following functions by means of the Console display and keyboard and joystick control:

1. Select Teach or Reproduce modes (joystick switch).
2. In Teach mode:
   a. Activate or deactivate any axis or axes.
   b. Record data or not as desired.
   c. Choose to remain in Teach or to enter Reproduce mode.

d. When data array is full, choose to record data in mass storage or to Reteach (start over) or to select Reproduce mode.

3. In Reproduce Mode:
   a. Choose to reproduce the pattern in the workspace memory, to store it, or to retrieve another program from mass storage.
   b. Choose to remain in Reproduce or to select Teach mode.
   c. Select operating parameters at the beginning of a run.
   d. Abort run by pressing "RETURN" key.

In the foregoing description, we have referred to the machine tool as a wheel. That wheel may be a cutting or grinding wheel or may have a cutting or grinding belt trained around it as is shown in our FIGS. 1 and 2.

TABLE OF COMPONENTS

| Reference | Designation | Description | Manufacturer |
|---|---|---|---|
| 77 | Linear Transducer | Series A86 | Moog, Inc. |
| 85 | Servo Valve | Series 62-105 | Moog, Inc. |
| 106 | Dual Floppy Disc Drive | RX 01 or RX 02 | Digital Equipment Corp. |
| 107 | Floppy Disc Control Card | RXV-11 | Digital Equipment Corp. |
| 108 | Dual Tape Drive | TU-58 | Digital Equipment Corp. |
| 110 | Digital Computer | LSI-11/2 | Digital Equipment Corp. |
| 111 | Dual Height Card | KD11-HA | Digital Equipment Corp. |
| 112 | Memory Card | MSV11-DC | Digital Equipment Corp. |
| 121 | Analog-to-Digital converter | RTI-1250 | Analog Devices Inc. |
| 122 | Digital-to-Analog converter | RTI-1252-4 | Analog Devices Inc. |
| 123 | Digital-to-Analog converter | RTI-1252-4 | Analog Devices Inc. |
| 124 | Parallel In-Out Card | DRV11 | Digital Equipment Corp. |
| 125 | Multi-Purpose Card | MXV11-AC | Digital Equipment Corp. |
| 131 | Servo Amplifier | 122-105 | Moog Inc. |
| 135 | Servo Amplifier | 122-105 | Moog Inc. |
| 150 | Console | VT-103 or RT-100 | Digital Equipment Corp. |

We claim:

1. In a metal removing system comprising a workpiece holder and a power-operated rotatable metal-removing tool mounted for movement against each other by positioning means, means connected with said positioning means generating signals indicative of successive positions of said tool and said holder with respect to each other, and memory means for storing control signal for said positioning means, the improvement comprising operator-directed means connected with said positioning means for causing said workpiece holder and said tool to trace a three dimensional path for said tool over a three dimensional workpiece pattern, operator-directed means for storing in said memoroy said signals generated at said successive positions in said path, and operator-directed means for automatically retrieving said signals from said memory and applying them to said positioning means so as to cause said tool to remove metal from a workpiece along said path, whereby successive three-dimensional workpieces can be machined to the countour of said workpiece pattern.

2. The system of claim 1 in which said positioning means for said workpiece holder include a manipulator translatable about a first plurality of axes and rotatable about a second plurality of axes.

3. The system of claim 1 in which said positioning means for said metal-removing tool apply less pressure when causing said workpiece holder and said tool to trace a path for said tool over a workpiece pattern than when causing said tool to remove metal from a workpiece.

4. The system of claim 1 including means for causing said tool to remove metal from a workpiece along said path at a higher speed than said tool traces said path on a workpiece patern.

5. The system of claim 1 in which the power-operated metal-removing tool rotates about a horizontal axis and in which it moves from and toward said workpiece holder in an arc in a vertical plane.

6. The system of claim 1 including means for dynamically measuring power consumed by said power-operated rotatable metal-removing tool and means controlled by that measurement for adjusting said power-operated movement of said rotatable metal-removing tool so as to limit the pressure applied by said tool.

7. The system of claim 6 including means controllable by said power measurement for operating said positioning means so as to cause said rotatable metal-removing tool to retrace the portion of its path through which the pressure applied by it exceeds a pre-determined limit.

8. The system of claim 6 including means for limiting said pressure applied between upper and lower values whereby the tool path is allowed to vary sufficiently to accommodate manufacturing tolerances of said workpieces.

* * * * *

UNITED STATES PATENT AND TRADEMARK OFFICE
CERTIFICATE OF CORRECTION

PATENT NO. : 4,570,385

DATED : February 18, 1986

INVENTOR(S) : JOHN M. RICHTER, JAMES G. BAIR, JR.

It is certified that error appears in the above-identified patent and that said Letters Patent is hereby corrected as shown below:

In [57] Abstract, line 16, change "transverse" to --traverse--.

Column 9, line 40, after "follows", insert --:--.

Column 9, line 43, after "switches", insert --:--.

Signed and Sealed this

Eighteenth Day of November, 1986

Attest:

DONALD J. QUIGG

*Attesting Officer*  *Commissioner of Patents and Trademarks*